US006810243B2

(12) United States Patent
Torabi

(10) Patent No.: US 6,810,243 B2
(45) Date of Patent: Oct. 26, 2004

(54) SURROGATE SERVICE ATTENDANT

(75) Inventor: Mohammad Torabi, Dana Point, CA (US)

(73) Assignee: Lucent Technologies Inc., Murray Hill, NJ (US)

( * ) Notice: Subject to any disclaimer, the term of this patent is extended or adjusted under 35 U.S.C. 154(b) by 496 days.

(21) Appl. No.: 09/845,139

(22) Filed: Apr. 30, 2001

(65) Prior Publication Data

US 2002/0160776 A1 Oct. 31, 2002

(51) Int. Cl.[7] ..................................... H04M 3/42

(52) U.S. Cl. ................ 455/417; 455/412.2; 455/435.1; 455/456.5; 379/211.02

(58) Field of Search ........................ 455/412.2, 414.1, 455/417, 424, 428, 435.1, 456.5, 432.3, 445, 461; 379/211.02

(56) References Cited

U.S. PATENT DOCUMENTS 5,293,641 A * 3/1994 Kallin et al. ................ 455/453
6,157,831 A * 12/2000 Lamb ......................... 455/433
6,373,930 B1 * 4/2002 McConnell et al. ... 379/114.28
6,556,821 B1 * 4/2003 Lindgren et al. ........... 455/413
6,628,947 B1 * 9/2003 Yu et al. .................. 455/435.1
2001/0041557 A1 * 11/2001 Hurme ....................... 455/410

* cited by examiner

*Primary Examiner*—William Trost
*Assistant Examiner*—James D Ewart
(74) *Attorney, Agent, or Firm*—Jimmy Goo

(57) ABSTRACT

Disclosed is a surrogate service attendant for ensuring invocation of services subscribed to by users of mobile-terminal equipment which are unattached or unregistered. When a call for an unattached/unregistered user mobile-telephone equipment (UE) is received by a wireless communication network, the surrogate service attendant will ensure invocation of the user's service subscriptions according to a set of service handling instructions. The service handling instructions may be issued by an application server, which is operable to execute service logic programs for various value added services.

7 Claims, 2 Drawing Sheets

SURROGATE SERVICE ATTENDANT

FIELD OF THE INVENTION

The present invention relates generally to wireless communication networks and, in particular, to network elements for attending a user's mobile-terminal equipment.

BACKGROUND OF THE RELATED ART

Communication services are provided to users' mobile-terminal equipment (UE) by wireless communication networks. The wireless communication network provides communication services to a particular UE is referred to as a serving network that with respect to that UE. Before a UE can avail itself of the services provided by any wireless communication network, the UE must become attached to a wireless communication network. Upon attaching, the UE enters a call send/receive state by registering with its serving network to send/receive calls in real-time. In the call send/receive state, the UE is attended by a network element. The particular network element attending the UE is called a Serving Call State Control Function (S-CSCF) or a Serving Session Management Function (S-SMF) in specifications defined by the well-known 3GPP and 3GPP2 partnership projects, respectively. For purposes of this application, the attending network element will hereinafter be referred to as an "active service attendant." The active service attendant provides all functionalities necessary for controlling and managing all incoming/outgoing calls to/from the UE, and ensures invocation of all applicable service subscriptions of the UE.

UEs unattached to and unregistered with a serving network are not attended by an active service attendant for sending/receiving calls. Calls to unattached/unregistered UEs are greeted by an unavailability announcement of sort indicating that the called party is unavailable. For example, the unavailability announcement states that "the person you are trying to reach is unavailable at this time" or "please leave a message." Typically, it is the wireless communication network service provider's choice as to which unavailability announcement is used.

When a UE is unattached or unregistered, some or all services subscribed to by the associated user may not be invoked. For example, calls to users with call forwarding service subscriptions may not be forwarded if the associated UEs are unattached or unregistered. Accordingly, there exist a need for ensuring invocation of all or some services subscribed to by users of unattached or unregistered UEs.

SUMMARY OF THE INVENTION

The present invention is a surrogate service attendant for ensuring invocation of services subscribed to by users of mobile-terminal equipment which are unattached or unregistered. When a call for an unattached/unregistered user mobile-telephone equipment (UE) is received by a wireless communication network, the surrogate service attendant will ensure invocation of the user's service subscriptions according to a set of service handling instructions. In one embodiment, the service handling instructions are issued by an application server, which is operable to execute service logic programs for various value added services.

BRIEF DESCRIPTION OF THE DRAWINGS

The features, aspects, and advantages of the present invention will become better understood with regard to the following description, appended claims, and accompanying drawings where:

DETAILED DESCRIPTION

The present invention is a surrogate service attendant for ensuring invocation of services subscribed to by users of mobile-terminal equipment which are unattached or unregistered. The surrogate service attendant is a service attendant for handling subscribed services that are applicable during unattached/unregistered periods of a user mobile-telephone equipment (UE). An example of such service subscriptions could be the call forwarding (CF) service. Another example could be an emergency call alarm by paging/notifying/alarming unattached/unregistered users, at a different predetermined telephone number or email address, of an urgent/emergency incoming call. A one-to-n correspondence exist between surrogate service attendants and UEs.

In one embodiment, the surrogate service attendant is a part of a terminating home network, e.g., wireless communication network subscribed to by the user being called. The surrogate service attendant may be implemented as software in an ASIC, DSP or equivalent. In one embodiment, the surrogate service attendant is implemented in a manner similar to service switch software.

Calls to a user of an unattached/unregistered UE are handled by the surrogate service attendant according to a set of customized or personalized service handling instructions. This set of customized/personalized service handling instructions are issued by an application server, and are pre-programmed or pre-activated by either the user or the wireless communication network service provider subscribed to by the user. The application server includes service logic programs for one or more different value added services to which users may subscribe, i.e., service subscriptions. The application server being operable to obtain user specific data or information from a user service profile, the user or the wireless communication network subscribed to by the user, and to execute service logic programs using the user specific data. The obtained user specific data or information is used by the application server's service logic program to determine a set of service handling instructions for provisioning the associated value added service.

For example, for unattached/unregistered UEs with CF service subscriptions, the application server may instruct the surrogate service attendant not to accept some calls and/or to terminate some calls at the user's voice message box or forward some calls to a different UE. For purposes of discussion, the present invention will be described herein with reference to CF service subscriptions. This should not be construed to limit the present invention to CF service subscriptions. It would be apparent to those skilled in the art that the present invention is also applicable to other types of service subscriptions.

Figure 1:
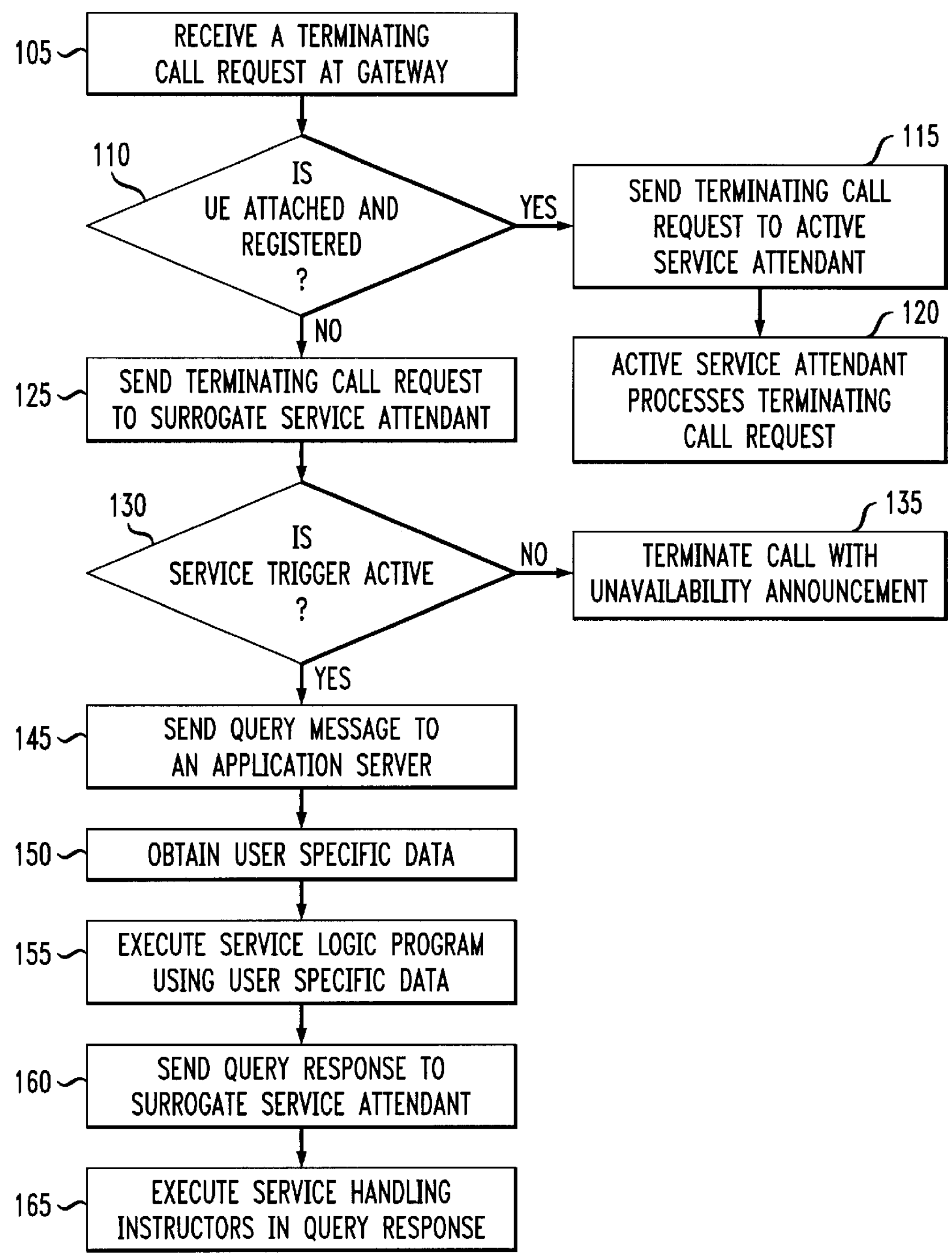
FIG. 1 depicts a flowchart illustrating the present invention with respect to a call forwarding service subscription.

FIG. 1 depicts a flowchart 100 illustrating the present invention with respect to a call forwarding subscription. In step 105, a wireless communication network receives, through its gateway entity, a terminating call request message for an UE associated with one of its subscribers, wherein such a wireless communication network is referred to herein as a "home network." A gateway entity being a border element in a network for deciding on directing/routing (and possibly protocol mapping/conversion) of incoming/outgoing protocol messages to/from the network. Examples of a gateway entity and a terminating call request message are an Interrogating CSCF (I-CSCF) and a "SIP Invite" message in the aforementioned 3GPP specifications. The I-CSCF is defined as a contact point within a wireless communication network for all connections destined to a subscriber of that wireless communication network. The "SIP Invite" message is a signaling message requesting for establishment of a session. In step 110, it is determined whether the terminating call request message is for an UE that is attached and registered with the home network, i.e., is home network also the serving network. In one embodiment, the gateway entity queries a home subscriber server (HSS) network entity having data on users' service attendants addresses, locations, service subscriptions and security related items. If an active service attendant's address is returned to the gateway entity by the HSS, then it is determined that the associated UE is attached and registered. If a surrogate service attendant address is returned to the gateway entity by the HSS, then it is determined that the associated UE is unattached, unregistered or both. If the terminating call request message is for an attached and registered UE, in step 115, the terminating call request message is directed from the gateway entity to an active service attendant associated with the attached and registered UE. Note that active service attendants are associated with UEs once the UEs are attached and registered. In step 120, the active service attendant processes the terminating call request message in a well-known manner, which causes the call to be terminated at the called party's UE.

If the terminating call request message is for an unattached/unregistered UE, in step 125, the terminating call request message is directed from the gateway entity to a surrogate service attendant associated with the unattached/unregistered UE. A surrogate service attendant may be associated with a number of unattached/unregistered UEs in a variety of manners. In one embodiment, surrogate service attendants are permanently associated as default surrogate service attendants to a group of UEs, which is a form of static assignment of the surrogate service attendants. In another embodiment, surrogate service attendants have real-time association to a group of UEs, which is a form of dynamic assignment of the surrogate service attendants. The assignment of the surrogate service attendant is done by the user's home network.

In step 130, the surrogate service attendant checks a service trigger associated with the CF service subscription of the unattached/unregistered UE, wherein the detection of a CF service trigger indicates whether the CF service subscription of the unattached/unregistered UE has been activated. In alternate embodiments, the surrogate service attendant checks service triggers of other value added services.

If the CF service trigger indicates that the CF service subscription is not active, in step 135, the surrogate service attendant causes the call to be terminated with an unavailability announcement. Note that the call may not be terminated with the unavailability announcement if other service triggers were active. If the CF service trigger indicates that the CF service subscription is active, in step 145, the surrogate service attendant arms the service trigger by sending a query message to the application server associated with CF service subscriptions (i.e., application server with service logic program for CF) for instructions on how to handle the call. The query message indicating the user associated with the terminating call request message. In one embodiment (and as an built-in characteristics of the protocol transporting the message), the query message indicates the identity of the surrogate service attendant from which the query originated. Note that if other service triggers were also active, the surrogate service attendant would send query messages to application servers associated with the other active value added services.

In step 150, the application server, if necessary, obtains user specific data or information related to the user associated with the terminating call request message (as indicated in the query message). In one embodiment, the application server obtains user specific data by querying either the user service profile, the user or the wireless communication network with which the user has subscription. In step 155, the application server executes a service logic program for the CF service using the user specific data. The output of the execution of the service logic program is a set of service handling instructions to be sent to the surrogate service attendant for handling the CF service associated with the terminating call. The application server returns to the surrogate service attendant, in step 160, a query response indicating the set of service handling instructions, wherein the query response may further indicate the particular surrogate service attendant to which the query response is intended. In one embodiment, the set of service handling instructions can be "to terminate the call to a voice message box" or "to send the terminating call request message back to the gateway entity so that it can be forwarded to another UE in the same or another wireless communication network." In step 165, the surrogate service attendant deploys the set of service handling instructions in the query response and handles the call request according to the instructions.

Figure 2:
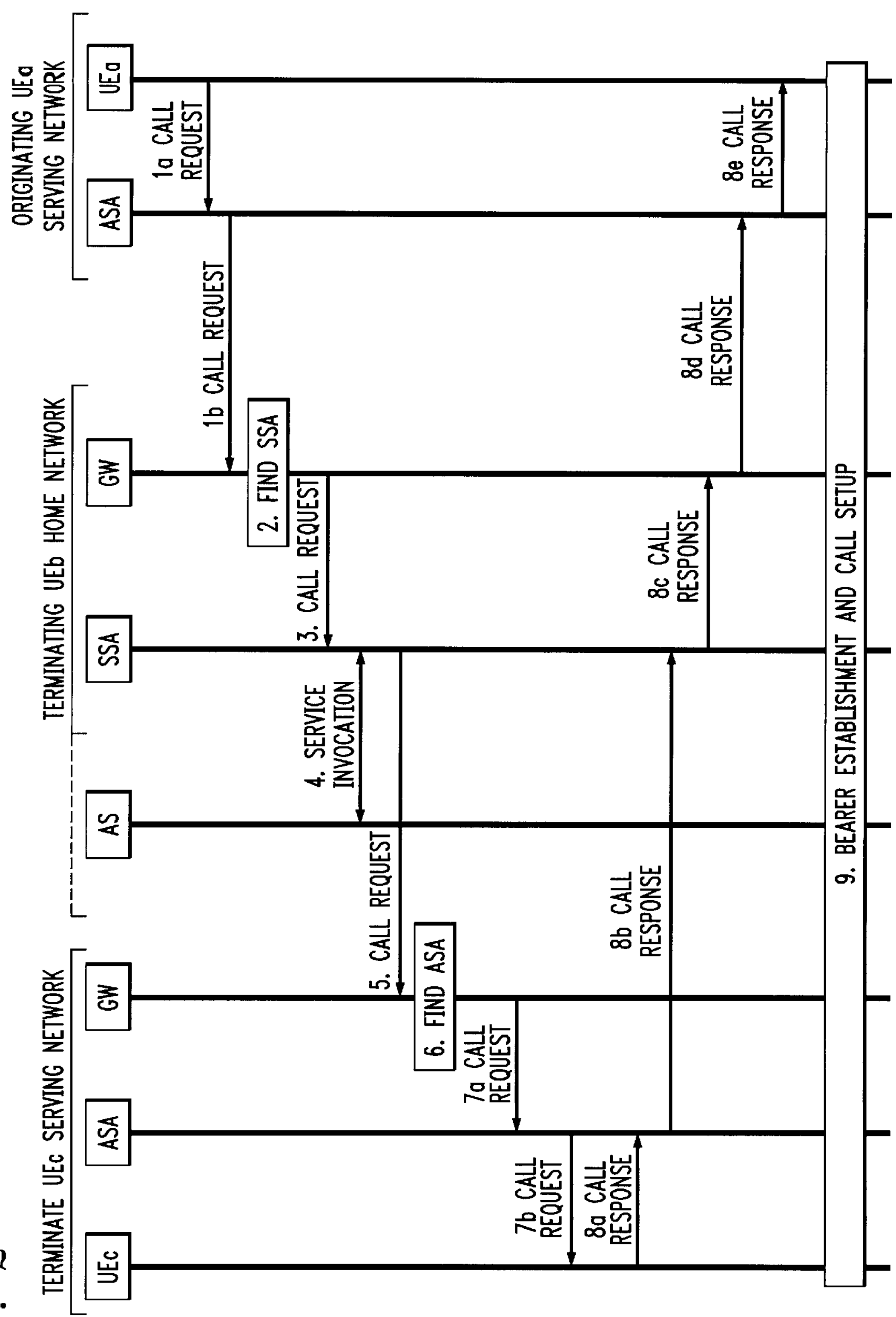
FIG. 2 depicts a chart illustrating an example of signaling flow in accordance with an embodiment of the present invention in which an unattached/unregistered UE is associated with a call forwarding service subscription.

FIG. 2 depicts a chart 200 illustrating an example of the signaling flow in accordance with an embodiment of the present invention in which an unattached/unregistered UE of user b (i.e., UEb) is associated with a CF service subscription. Note that, in this example, CF is based on the well-known "calling line identification" (CLI) for fixed networks or "calling number identification" (CNI) for wireless communication network, and it is assumed that the terminating call request message supports inclusion of the CLI or CNI, wherein the CLI and CNI are E.164 numbers or IP addresses of a calling party in wireline and wireless networks, respectively. In step 1*a*, user a's mobile-telephone equipment, i.e., UEa, originates a terminating call request message, such as the SIP Invite message, to its associated active service attendant (ASA). The terminating call request message being intended for UEb.

In step 1*b*, the active service attendant for UEa sends the terminating call request message to the gateway entity of UEb's home network, i.e., wireless communication network to which user b is a subscriber, wherein the terminating call request message indicates UEb as the intended recipient. In step 2, the gateway entity associated with UEb queries the HSS network entity (or its equivalent) belonging to UEb's home network for the address of UEb's service attendant.

In this example, UEb is unattached/unregistered, thus, in step 3, the address of UEb's surrogate service attendant (SSA) is returned to the gateway entity which, in turn, forwards the terminating call request message to UEb's surrogate service attendant. In step 4, UEb's surrogate service attendant checks service triggers associated with user b and, upon determining from user b's associated service triggers that user b has an active CF service subscription, UEb's surrogate service attendant interacts with the application server (AS) having the service logic program for the CF service. During the interaction, UEb's surrogate service attendant sends a query message to the application server; the application server obtains user specific data for user b; the application server executes the service logic program for CF service subscriptions using the user specific data to obtain a set of service handling instructions for handling the CF service subscription of user b, wherein the set of service handling instructions indicates to the surrogate service attendant to forward the terminating call request message to user c's mobile-telephone equipment (UEc) and the application server returns to UEb's surrogate service attendant a query response having the set of service handling instructions. In one embodiment, the service logic program for the CF service is the CFonCNI, which forwards incoming calls to called parties based on calling parties' Number ID.

In step 5, UEb's surrogate service attendant deploys the set of service handling instructions in the query response by instructing UEb's home network to forward the terminating call request message to UEc's home network via its associated gateway entity. Note that in this example, UEc's home network is also UEc's serving network. In step 6, the gateway entity of UEc's home network queries an HSS network entity (or its equivalent) belonging to UEc's home network for the address of UEc's service attendant which, in this case, is an active service attendant. The address of UEc's active service attendant is returned to the gateway entity.

In step 7, the gateway entity forwards the terminating call request message to UEc's active service attendant which, in turn, sends the terminating call request to UEc. In step 8*a* through 8*e*, upon receiving the terminating call request message, UEc returns a terminating call response message to its active service attendant which is eventually returned all the way to UEa to notify UEa of the end result, i.e., the call has been forwarded to UEc. An example of a call response message is a "SIP Progress", which is a signaling message responding to the "SIP Invite" message. Specifically, the terminating call response message is sent from UEc's active service attendant to UEb's surrogate service attendant, to the gateway entity of UEb's home network, to UEa's active surrogate attendant and to UEa. In one embodiment, the call response message may not involve the entities associated with the UEb. In step 9, bearer establishment and call setup between UEa and UEc is performed. In one embodiment, UEb's surrogate service attendant need no longer be involved in the call setup between UEc and UEa.

Implementations of the surrogate service attendant function may require designation of an independent service attendant to be in charge of the applicable subscribed services for unattached/unregistered UEs. Such an independent service attendant may be a call state control function (CSCF) or a serving session management function (SMF), as they are known in the well-known 3GPP and 3GPP2's specifications, respectively. In small networks or networks with a small number of subscriptions for a particular service (e.g., CF service), it might be desirable to implement the surrogate service attendant functions in an existing active service attendant box with a multi-task software architecture, which may use one generic service attendant middle-ware with a multi-applications top layer.

It is to be understood that the above-described embodiments are merely illustrative of the invention and that many variations may be devised by those skilled in the art without departing from the scope of the invention. For example, the sequence of steps specified in the above description may be varied to achieve the same objective, the service descriptions described above may be value added services other than call forwarding, or the call may be forwarded to any type of communication device (such as another mobile-telephone equipment, a wireline telephone, a computer, a fax machine, etc.). It is therefore intended that such variations be included within the scope of the following claims.

I claim:

1. A wireless communication network comprising:

a surrogate service attendant for handling calls to an unattached or unregistered mobile-telephone equipment, the surrogate service attendant being operable to receive a terminating call request message, to check a service trigger associated with the unattached or unregistered mobile-telephone equipment to determine whether the service trigger is active in response to the received terminating call request message, to transmit a query message in response to an active service trigger and to receive a query response in response to the transmitted query message;

an application server having a service logic program for a value added service associated with the active service trigger, the application server being operable to issue a set of service handling instructions in response to the received query message using the service logic program and to transmit the query response indicating the set of service handling instructions;

a database having addresses on service attendants attending users of the wireless communication network; and a gateway entity for receiving the terminating call request message, the gateway entity being operable to use the database to retrieve an addresses of a service attendant associated with a user indicated in received terminating call request message in response to receiving the terminating call request message and to transmit the received terminating call request messages to the service attendant associated with the retrieved address.

2. The wireless communication network of claim 1, wherein the surrogate service attendant is further operable to execute the set of service handling instructions indicated in the received query response.

3. The wireless communication network of claim 2, wherein the set of service handling instructions indicate to the surrogate service attendant to cause the terminating call request message to be forwarded to a communication device other than the unattached or unregistered mobile-telephone equipment.

4. The wireless communication network of claim 1, wherein the database is a home subscriber server network entity.

5. The wireless communication network of claim 1, wherein the surrogate service attendant is operable to transmit the terminating call request message received from the gateway entity and an indication of another communication device to the gateway entity, and the gateway entity is operable to cause the terminating call request message received from the surrogate service attendant to be transmitted to the other communication device indicated by the surrogate service attendant.

6. The wireless communication network of claim 1 further comprising:

an active service attendant for handling calls to an attached and registered mobile-telephone equipment.

7. A method of handling terminating call request messages for an unattached or unregistered mobile-telephone equipment of a wireless communication network comprising the steps of:

receiving at a gateway entity a terminating call request message for a mobile-telephone equipment;

determining an address for a surrogate service attendant associated with the mobile-telephone equipment in response to receiving the terminating call request message if the mobile-telephone equipment is unattached or unregistered with the wireless communication network;

transmitting to the gateway entity the terminating call request message received from the gateway entity and an indication of another communication device.

* * * * *